(12) United States Patent  (10) Patent No.: US 9,186,977 B2
Kimes  (45) Date of Patent: Nov. 17, 2015

(54) DRIVE SYSTEM INCLUDING A TRANSMISSION FOR A HYBRID ELECTRIC VEHICLE

(71) Applicant: Means Industries, Inc., Saginaw, MI (US)

(72) Inventor: John W. Kimes, Wayne, MI (US)

(73) Assignee: MEANS INDUSTRIES, INC., Saginaw, MI (US)

( * ) Notice: Subject to any disclaimer, the term of this patent is extended or adjusted under 35 U.S.C. 154(b) by 236 days.

(21) Appl. No.: 14/086,202

(22) Filed: Nov. 21, 2013

(65) Prior Publication Data

US 2014/0080648 A1  Mar. 20, 2014

Related U.S. Application Data

(63) Continuation-in-part of application No. 13/218,817, filed on Aug. 26, 2011, now Pat. No. 8,888,637.

(60) Provisional application No. 61/753,627, filed on Jan. 17, 2013.

(51) Int. Cl.

| | |
|---|---|
| *B60K 6/543* | (2007.10) |
| *F16H 3/72* | (2006.01) |
| *B60K 6/365* | (2007.10) |
| *B60K 6/387* | (2007.10) |
| *B60K 6/445* | (2007.10) |
| *F16H 37/08* | (2006.01) |
| *F16H 37/10* | (2006.01) |
| *B60K 6/38* | (2007.10) |

(52) U.S. Cl.
CPC ............... *B60K 6/543* (2013.01); *B60K 6/365* (2013.01); *B60K 6/387* (2013.01); *B60K 6/445* (2013.01); *F16H 3/728* (2013.01); *B60K 2006/381* (2013.01); *F16H 2037/0886* (2013.01); *F16H 2037/103* (2013.01); *F16H 2200/0039* (2013.01); *F16H 2200/0043* (2013.01); *F16H 2200/2023* (2013.01); *F16H 2200/2087* (2013.01); *Y10S 903/902* (2013.01)

(58) Field of Classification Search
CPC .. F16H 3/663; F16H 3/728; F16H 2200/2023; B60K 6/365; B60K 6/387; B60K 6/543
USPC ........................................................ 475/5, 151
See application file for complete search history.

(56) References Cited

U.S. PATENT DOCUMENTS

| | | |
|---|---|---|
| 2,960,287 A | 11/1960 | Barlow |
| 3,130,989 A | 4/1964 | Lannen |

(Continued)

*Primary Examiner* — Huan Le
(74) *Attorney, Agent, or Firm* — Brooks Kushman P.C.

(57) ABSTRACT

A drive system including a transmission for a hybrid electric vehicle is provided. The system includes a gear set having first, second, third and fourth elements. The second element connects with an output shaft of the transmission and a first output shaft of an internal combustion engine connects with the third element for driving the third element. An electric motor having an output shaft connecting with the first element drives the first element in response to an electrical signal. An electric motor-generator unit has an output shaft which connects with the fourth element for driving the fourth element in response to an electrical signal. A second output shaft of the engine also connects with the fourth element through the unit for driving the fourth element. The resulting system has a plurality of different operating modes including a reverse gear or operating mode powered electrically and by the internal combustion engine.

20 Claims, 7 Drawing Sheets

(56) References Cited

U.S. PATENT DOCUMENTS

| | | | |
|---|---|---|---|
| 4,050,560 | A | 9/1977 | Torstenfelt |
| 5,052,534 | A | 10/1991 | Gustin et al. |
| 5,206,573 | A | 4/1993 | McCleer et al. |
| 5,231,265 | A | 7/1993 | Hackett et al. |
| 5,362,293 | A | 11/1994 | Romanauskas |
| 5,387,854 | A | 2/1995 | McCleer et al. |
| 5,394,321 | A | 2/1995 | McCleer et al. |
| 5,453,598 | A | 9/1995 | Hackett et al. |
| 5,509,491 | A * | 4/1996 | Hall, III ................. 180/9.44 |
| 5,638,929 | A | 6/1997 | Park |
| 5,642,009 | A | 6/1997 | McCleer et al. |
| 5,678,668 | A | 10/1997 | Sink |
| 5,847,469 | A | 12/1998 | Tabata et al. |
| 5,856,709 | A | 1/1999 | Ibaraki et al. |
| 5,918,715 | A | 7/1999 | Ruth et al. |
| 5,927,455 | A | 7/1999 | Baker et al. |
| 5,934,395 | A | 8/1999 | Koide et al. |
| 6,019,699 | A | 2/2000 | Hoshiya et al. |
| 6,065,576 | A | 5/2000 | Shaw et al. |
| 6,075,302 | A | 6/2000 | McCleer |
| 6,193,038 | B1 | 2/2001 | Scott et al. |
| 6,237,931 | B1 | 5/2001 | Marola |
| 6,244,965 | B1 | 6/2001 | Klecker et al. |
| 6,290,044 | B1 | 9/2001 | Burgman et al. |
| 6,306,057 | B1 | 10/2001 | Morisawa et al. |
| 6,344,008 | B1 | 2/2002 | Nagano et al. |
| 6,503,167 | B1 | 1/2003 | Sturm |
| 6,814,201 | B2 | 11/2004 | Thomas |
| 6,846,257 | B2 | 1/2005 | Baker et al. |
| 6,953,409 | B2 | 10/2005 | Schmidt et al. |
| 6,982,502 | B1 | 1/2006 | Sendaula et al. |
| 7,093,512 | B2 | 8/2006 | Ibamoto et al. |
| 7,153,228 | B2 | 12/2006 | Fujiu et al. |
| 7,198,587 | B2 | 4/2007 | Samie et al. |
| 7,201,690 | B2 | 4/2007 | Miura et al. |
| 7,223,198 | B2 | 5/2007 | Kimes et al. |
| 7,223,200 | B2 | 5/2007 | Kojima et al. |
| 7,237,634 | B2 | 7/2007 | Severinsky et al. |
| 7,255,186 | B2 | 8/2007 | Wakuta et al. |
| 7,256,510 | B2 | 8/2007 | Holmes et al. |
| 7,258,214 | B2 | 8/2007 | Pawley et al. |
| 7,275,628 | B2 | 10/2007 | Pawley et al. |
| 7,344,010 | B2 | 3/2008 | Fetting, Jr. et al. |
| 7,349,010 | B2 | 3/2008 | Bryant et al. |
| 7,393,296 | B2 | 7/2008 | Kano et al. |
| 7,397,296 | B1 | 7/2008 | Kiani |
| 7,426,971 | B2 | 9/2008 | Kano et al. |
| 7,464,801 | B2 | 12/2008 | Wittkopp |
| 7,484,605 | B2 | 2/2009 | Pawley et al. |
| 7,491,151 | B2 | 2/2009 | Maguire et al. |
| 7,614,466 | B2 | 11/2009 | Kano et al. |
| 7,621,359 | B2 | 11/2009 | Kano et al. |
| 7,633,247 | B2 | 12/2009 | Obayashi |
| 7,690,455 | B2 | 4/2010 | Kano et al. |
| 7,695,387 | B2 * | 4/2010 | Oba ................. 475/5 |
| 7,806,795 | B2 | 10/2010 | Oba et al. |
| 7,942,781 | B2 | 5/2011 | Kimes |
| 2006/0138777 | A1 | 6/2006 | Hofbauer et al. |
| 2006/0185957 | A1 | 8/2006 | Kimes et al. |
| 2007/0021264 | A1* | 1/2007 | Honda et al. ................. 475/221 |
| 2007/0056825 | A1 | 3/2007 | Fetting, Jr. et al. |
| 2007/0072725 | A1* | 3/2007 | Bucknor et al. ................. 475/5 |
| 2007/0107960 | A1 | 5/2007 | Takami et al. |
| 2007/0278061 | A1 | 12/2007 | Wittkopp et al. |
| 2008/0093190 | A1 | 4/2008 | Belmont |
| 2008/0110715 | A1 | 5/2008 | Pawley |
| 2008/0169165 | A1 | 7/2008 | Samie et al. |
| 2008/0169166 | A1 | 7/2008 | Wittkopp et al. |
| 2008/0185253 | A1 | 8/2008 | Kimes |
| 2008/0223681 | A1 | 9/2008 | Stevenson et al. |
| 2008/0245360 | A1 | 10/2008 | Almy et al. |
| 2009/0084653 | A1 | 4/2009 | Holmes |
| 2009/0098970 | A1 | 4/2009 | Kimes |
| 2009/0127059 | A1 | 5/2009 | Knoblauch |
| 2009/0133981 | A1 | 5/2009 | Tarasinski et al. |
| 2009/0142207 | A1 | 6/2009 | Ring et al. |
| 2009/0159391 | A1 | 6/2009 | Eisengruber |
| 2009/0194381 | A1 | 8/2009 | Samie et al. |
| 2009/0211863 | A1 | 8/2009 | Kimes |
| 2009/0255773 | A1 | 10/2009 | Seufert et al. |
| 2010/0200358 | A1 | 8/2010 | Eisengruber et al. |
| 2010/0230226 | A1 | 9/2010 | Prout |
| 2010/0252384 | A1 | 10/2010 | Eisengruber |
| 2012/0145505 | A1 | 6/2012 | Kimes |
| 2012/0149518 | A1 | 6/2012 | Kimes |
| 2012/0152683 | A1 | 6/2012 | Kimes |
| 2012/0152687 | A1 | 6/2012 | Kimes et al. |

* cited by examiner

Fig. 3

| | Name | ICE | Mot A | Mot B | 1st, rev | 2nd, OD | hybrid | CVT/R/GR | Gen/PTO |
|---|---|---|---|---|---|---|---|---|---|
| EV Modes | 1st - A + B (Gen) | | x | x | x | | | x | |
| | 1st - A | | x | | x | | | x | |
| | 1st - B (Gen) | | | x | x | | | x | |
| | 1st - HH | | x | x | x | x-Coast | | x | |
| | CVT 1-2 | | x | x | | | | x | |
| | 2nd - A | | x | | | x-Frwd | | x | |
| | CVT 2 - 1:1 | | x | x | | | | x | |
| | CVT 1:1 | | x | x | | | | x | |
| | Rev A + B | | x | x | x | | | x | |
| | Rev A | | x | | x | | | x | |
| | Rev B | | | x | x | | | x | |
| | Rev - HH | | x | x | x | x-Frwd | | x | |
| | Park | | | | x | x-F/C | | | |
| | Neutral | | | | Note:1 | | | | |
| Hybrid Modes | Power - Split | x | x | x | | | x | x | |
| | 1st - Serial | x | x | x | x | | | | x |
| | 2nd - Serial | x | x | x | | x-F/C | | | x |
| | MAX Fwd | x | x | | | | x | x | |
| | OD w/A Boost | x | x | | | x-Frwd | x | | |
| | OD w/A + B Boost | x | x | x | | x-Frwd | x | x | |
| | Rev - Gas/A/B | x | x | x | x | | | x | |
| | Rev - Serial | x | x | x | x | | | | x |
| GAS Modes | OD | x | | | | x-F/C | x | | |
| | Rev - Gas | x | | | x | | | x | |
| Generator/PTO | AC Power | x | | x | x-Note2 | x-Note2 | | | x |
| | PTO | x | x | x | x | | | | x |

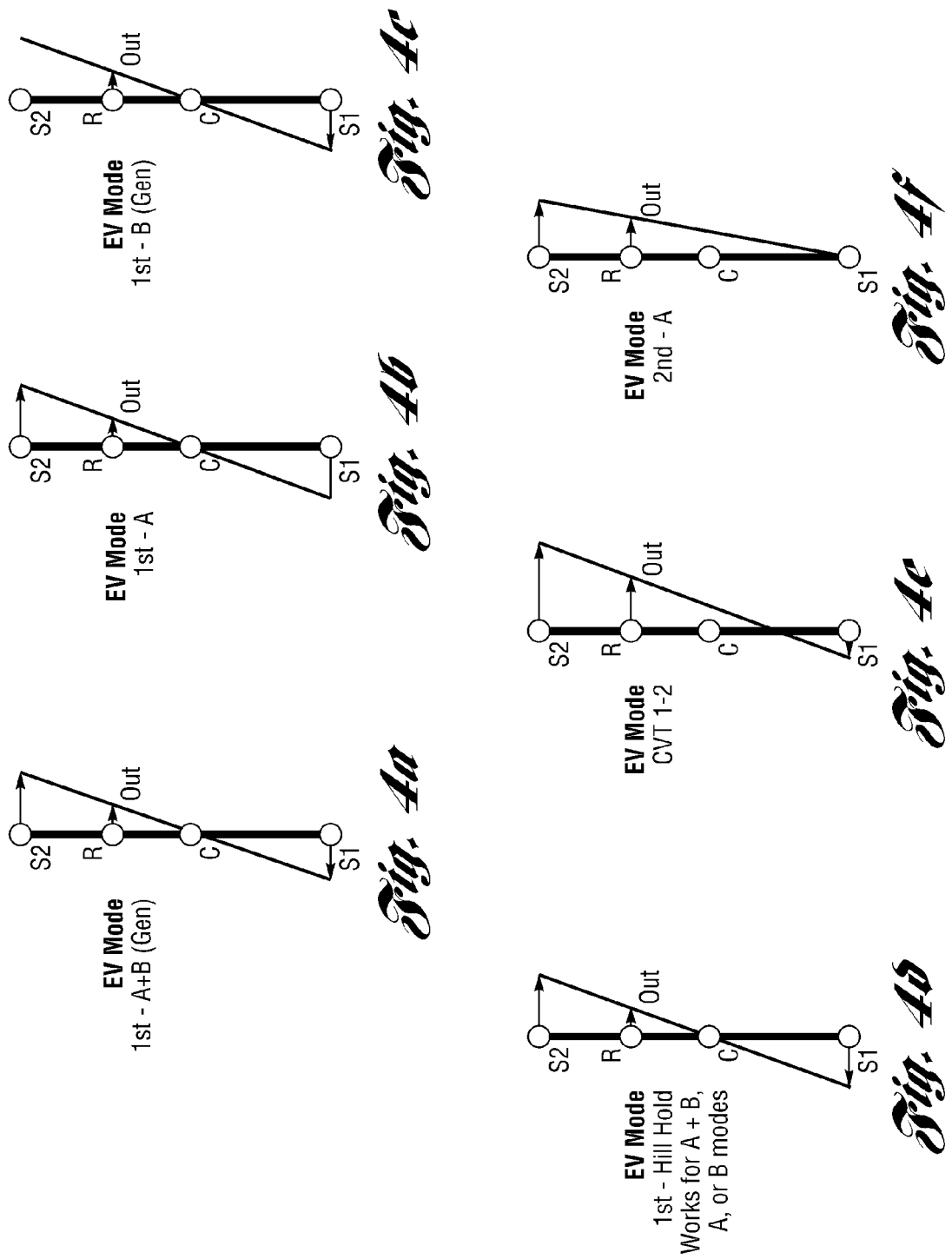

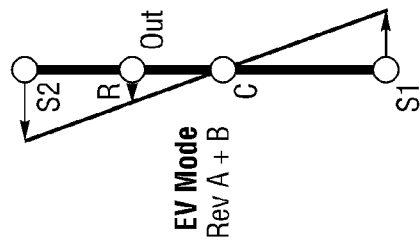
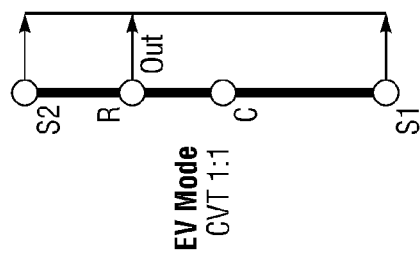
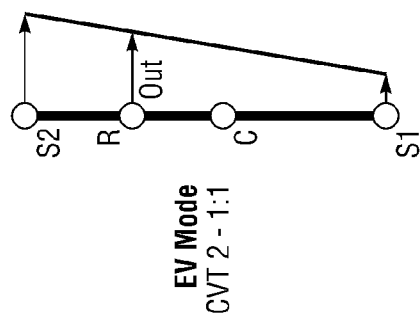
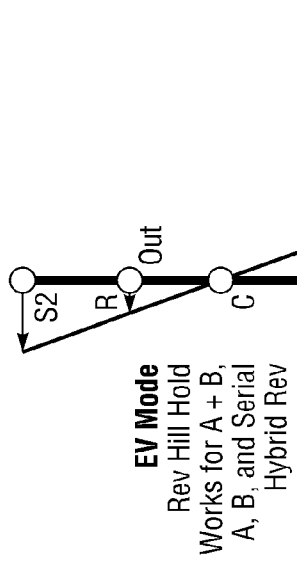
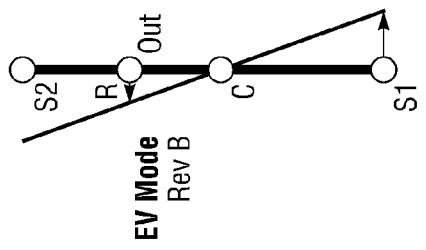
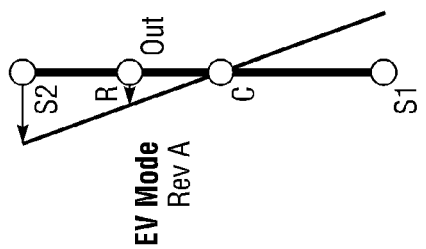

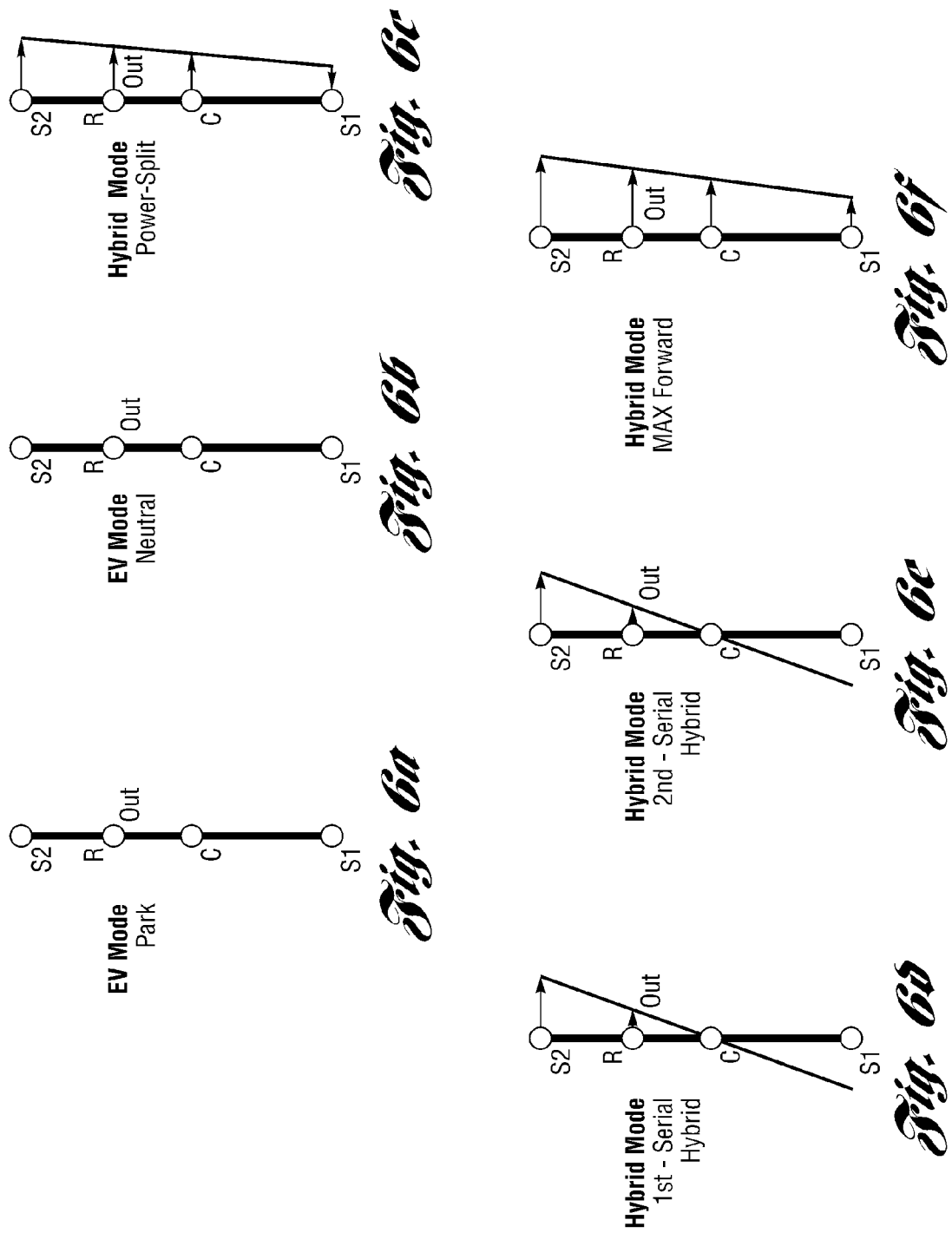

Hybrid Mode
Over Drive w/A Boost

Hybrid Mode
Over Drive w/A + B Boost

Hybrid Mode
Rev - Gas/A/B

Hybrid Mode
Rev - Serial Hybrid

Gas Mode
Over Drive

Gas Mode
Reverse

Generator/PTO
AC Power

Generator/PTO
PTO Operation

DRIVE SYSTEM INCLUDING A TRANSMISSION FOR A HYBRID ELECTRIC VEHICLE

CROSS-REFERENCE TO RELATED APPLICATION

This application claims the benefit of U.S. provisional application Ser. No. 61/753,627, filed Jan. 17, 2013 and is a continuation-in-part of U.S. patent Application entitled "Vehicle Drive System Including a Transmission" filed Aug. 26, 2011 and having U.S. Ser. No. 13/218,817.

TECHNICAL FIELD

This invention relates to hybrid electric vehicle power trains or drive systems including transmissions with an electric motor and an electric motor-generator unit and methods and systems for controlling such drive systems.

OVERVIEW

A battery electric vehicle (BEV) is a type of electric vehicle (EV) that uses chemical energy stored in rechargeable battery packs. BEVs use electric motors and motor controllers instead of internal combustion engines (ICEs) for propulsion.

A battery-only electric vehicle or all-electric vehicle derives all its power from its battery packs and thus has no internal combustion engine, fuel cell, or fuel tank.

Vehicles using both electric motors and internal combustion engines are examples of hybrid electric vehicles, and are not considered pure or all-electric vehicles because they cannot be externally charged (operate in charge-sustaining mode) and instead they are continually recharged with power from the internal combustion engine and regenerative braking.

A plug-in hybrid electric vehicle (PHEV), plug-in hybrid vehicle (PHV), or plug-in hybrid is a hybrid vehicle which utilizes rechargeable batteries, or another energy storage device, that can be restored to full charge by connecting a plug to an external electric power source (usually a normal electric wall socket). A PHEV shares the characteristics of both a conventional hybrid electric vehicle, having an electric motor and an internal combustion engine (ICE); and of an all-electric vehicle, having a plug to connect to the electrical grid. Most PHEVs on the road today are passenger cars, but there are also PHEV versions of commercial vehicles and vans, utility trucks, buses, trains, motorcycles, scooters, and military vehicles.

A multiple-ratio (i.e., step-ratio) automatic transmission in an automotive vehicle powertrain adjusts a gear ratio between a torque source and a driveshaft to meet driveability requirements under dynamically-changing driving conditions. Ratio changes are achieved by engaging a so-called on-coming clutch ("OCC") as a so-called off-going clutch ("OGC") is released. The clutches, which may be referred to as transmission friction elements or brakes, establish and disestablish power flow paths from an internal combustion engine to vehicle traction wheels. During acceleration of the vehicle, the overall speed ratio, which is the ratio of transmission input shaft speed to transmission output shaft speed, is reduced as vehicle speed increases for a given engine throttle settling. This is an up-shift.

In the case of a synchronous up-shift, the OCC engages to lower both the gear ratio (i.e., the overall speed ratio) and the torque ratio (the ratio of output torque to input torque). The synchronous up-shift event can be divided into three phases, which may be referred to as a preparatory phase, a torque phase, and an inertia phase. The torque phase is a time period when the OCC torque is controlled to decrease toward a non-significant level with an intention to disengage it. Simultaneously, during the torque phase, the OCC is controlled to increase from a non-significant level, thereby initiating the OCC engagement according to a conventional up-shift control. The clutch engagement and disengagement timing results in a momentary activation of two torque flow paths through the gearing, thereby causing torque delivery to drop momentarily at the transmission output shaft. This condition, which can be referred to as a "torque hole," occurs before the OGC disengages. A vehicle occupant can perceive a large torque hole as an unpleasant shift shock. The preparatory phase is a time period prior to the torque phase. The inertia phase is a time period when the OGC starts to slip due to substantially reduced holding capacity, following the torque phase.

Automated manual transmission (AMT), a type of automatic shifting transmission used in motor vehicles, improves mechanical efficiency by removing the torque converter. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. During a shift of an AMT, the engine torque is disconnected from the vehicle via a clutch. The torque is interrupted while the transmission changes ratio. After the ratio is changed, the clutch reapplies connecting the engine back to the drivetrain. The problem with this approach is that during the torque interruption, the driver is lunged forward in the cab and then lunged backwards when the engine hooks back up with the drivetrain. This shift event can be as long as a second. It is an undesirable shift feel. Also the vehicle has no acceleration during this transition leading to undesirable driving situations (pulling out into traffic, merging, etc.).

Today's step ratio automatic transmissions use hydraulics to power the ratio change, dampen NVH (i.e., noise, vibration and harshness), power coupling/decoupling, and providing lubrication and cooling. This is achieved with the use of a torque converter (for coupling/decoupling power, multiplying torque, and NVH dampening), an oil pump, valve body (or hydraulic logic), and friction-type clutches (bands and frictions which are activated by hydraulics to selectively lock and release components).

Multi-Plate Friction-Type Clutches and Brakes

Clutches and brakes are used to drive or hold members of a planetary gear set, respectively. As a general rule, multi-plate clutches connect one planetary member to another. Multi-plate brakes connect a planetary member to the transmission case to hold it stationary.

The clutches and brakes consist of a number of friction discs and steel discs. The friction discs are coated with a friction material and have engaging lugs (splines) on the inner perimeter. The steel discs are steel on both sides and have engaging lugs located on the outer perimeter. The engaging lugs on the friction discs are usually engaged with a planetary member. The engaging lugs on the steel discs are usually engaged with the clutch piston housing.

In addition to the friction and steel discs, there is also an apply piston, housing and return spring. Once hydraulic fluid is applied to the clutch assembly, the piston advances and the friction and steel discs will be locked together. Once the hydraulic pressure is released, the return spring will cause the piston to return to its rest position and the friction and steel discs will be unlocked.

A band-type brake is used for some applications. The brake band is a circular band with friction material bonded to the inner surface. The band wraps around a particular planetary component (clutch drum) and locks that component to the transmission case. The brake band is applied and released by the clutch apply piston.

In order to carry out a shift in ratio, fluid needs to be applied or released from the multi-plate clutch (or brake). The following method occurs:
  1. Fluid from a shift valve in the valve body is applied to the clutch assembly.
  2. Fluid pressure builds behind the apply piston and overcomes the resistance from diaphragm spring.
  3. The friction and steel discs are compressed together and become locked, preventing any slippage between them.
  4. Two planetary members are now locked together.
  5. When fluid pressure is released, the steel and friction discs are allowed to unlock.

This method has had some advantages. The power density is very high using hydraulics to clamp clutches and to multiply torque. Hydraulic systems have proven to have good dampening characteristics and smooth shift capability. It is also a natural way to lubricate the components in the transmission and to carry away heat from torque converters, pumps, gear sets, bearings, etc.

However, there are a few disadvantages. The first is efficiency. The pump is always on and pumping oil whenever the engine is running. When a friction element is turned on, power is used to maintain the clamping pressure of that friction element.

The slipping of the torque converter is also a significant source of parasitic loss and the open friction elements in the transmission provide drag and thus parasitic losses also. Another disadvantage is the complexity of these components. Clutches, pumps, torque converters, and valve bodies are among the most likely components within a transmission to have issues and thus drive warranty cost and negatively impact upon customer satisfaction. These components also tend to be the most expensive components in the transmission.

A one-way clutch (i.e., OWC) produces a drive connection (locked state) between rotating components when their relative rotation is in one direction, and overruns (freewheel state) when relative rotation is in the opposite direction. A typical one-way clutch consists of an inner ring, an outer ring and a locking device between the two rings. Two types of one-way clutches often used in vehicular, automatic transmissions include:
  Roller type which consists of spring loaded rollers between the inner and outer race of the one-way clutch. (Roller type is also used without springs on some applications); and
  Sprag type which consists of asymmetrically shaped wedges located between the inner and outer race of the one-way clutch.

The one-way clutches are typically used in the transmission to prevent an interruption of drive torque (i.e., power flow) during certain gear shifts and to prevent engine braking during coasting. Also, there is a one-way clutch in the stator of the torque converter.

A controllable OWC is an OWC where the lock action can be turned "off" such that it freewheels in both directions, and/or the lock action can be turned "on" such that it locks in one or both directions.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2012/0152683; 2012/0152687; 2012/0145505; 2012/0149518; 2011/0177900; 2010/0252384; 2009/0133981; 2009/0127059; 2009/0084653; 2009/0194381; 2009/0142207; 2009/0255773; 2010/0230226; 2010/0200358; 2009/0159391; 2009/0098970; 2008/0223681; 2008/0110715; 2008/0169166; 2008/0169165; 2008/0185253; 2007/0278061; 2007/0056825; 2006/0138777; 2006/0185957; and the following U.S. Pat. Nos. 8,079,453; 7,942,781; 7,806,795; 7,491,151; 7,464,801; 7,349,010; 7,275,628; 7,256,510; 7,223,198; 7,198,587; 7,093,512; 6,953,409; 6,846,257; 6,814,201; 6,503,167; 6,193,038; 4,050,560; 5,638,929; 5,362,293; 5,678,668; 5,052,534; 5,387,854; 5,231,265; 5,394,321; 5,206,573; 5,453,598; 5,642,009; 6,075,302; 6,982,502; 7,153,228; and 5,918,715.

U.S. patents which describe hybrid transmissions or power trains include: U.S. Pat. Nos. 5,847,469; 5,856,709; 5,934,395; 6,019,699; 6,306,057; 6,344,008; 7,201,690; 7,223,200; 7,237,634; 7,255,186; 7,393,296; 7,397,296; 7,426,971; 7,614,466; 7,621,359; 7,633,247; and 7,690,455.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

One problem associated with such prior art vehicle drive systems is that it is often disadvantageous to power a reverse gear or operating mode of the transmission solely from an energy storage device or battery of the vehicle.

SUMMARY OF EXAMPLE EMBODIMENTS

An object of at least one embodiment of the present invention is to provide a drive system including a transmission for a hybrid electric vehicle having an internal combustion engine wherein a reverse operating mode or gear of the transmission is powered electrically and by the internal combustion engine.

In carrying out the above object and other objects of at least one embodiment of the present invention, a drive system including a transmission for a hybrid electric vehicle is provided. The system includes a gear set including first, second, third and fourth elements. The second element connects with an output shaft of the transmission and a first output shaft of an internal combustion engine connects with the third element for driving the third element. The system also includes a transmission housing and an electric motor having an output shaft connecting with the first element for driving the first element in response to an electrical signal. The system further includes an electric motor-generator unit having an output shaft connecting with the fourth element for driving the fourth element in response to an electrical signal. A second output shaft of the engine connects with the fourth element through the unit for driving the fourth element. The system has a plurality of different operating modes including a reverse gear or operating mode powered electrically and by the engine.

The system may further include a non-friction brake assembly having a coupling state for coupling the fourth element to the housing and an uncoupling state for uncoupling the fourth element from the housing. The brake assembly is non-hydraulically controlled to change state to maintain a desired transmission ratio.

The system may further include a non-friction brake assembly having a coupling state for coupling the third element to the housing and an uncoupling state for uncoupling the third element from the housing. The brake assembly is non-hydraulically controlled to change state to maintain a desired transmission ratio.

The system may further include non-friction, first and second brake assemblies. The first brake assembly has a coupling state for coupling the fourth element to the housing and an uncoupling state for uncoupling the fourth element from the housing. The second brake assembly has a coupling state for coupling the third element to the housing and an uncoupling state for uncoupling the third element from the housing. The first and second brake assemblies are non-hydraulically controlled to change state to maintain a desired transmission ratio.

The system may further include a non-friction clutch assembly being non-hydraulically controlled to change between a coupling state for coupling the fourth element to the second engine output shaft through the unit and an uncoupling state for uncoupling the fourth element from the second engine output shaft.

The system may further include a non-friction clutch assembly being non-hydraulically controlled to change between a coupling state for coupling the unit to the second output shaft of the engine and an uncoupling state for uncoupling the unit from the second output shaft of the engine.

The first, second, third and fourth elements may comprise a first sun gear, at least one ring gear, at least one carrier and a second sun gear, respectively.

The system may further include a non-friction clutch assembly being non-hydraulically controlled to change between a coupling state for coupling the third element to the first output shaft of the engine and an uncoupling state for uncoupling the third element from the first output shaft of the engine.

The transmission may be an automatic transmission.

The transmission may be a multi-speed, step-ratio transmission having a CVT mode for automotive vehicles.

The gear set may be a Ravigneaux or a Simpson or a modified Ravigneaux gear set.

The second output shaft of the engine may be an auxiliary shaft.

The transmission may be a power-split, RWD transmission.

Further in carrying out the above object and other objects of at least one embodiment of the present invention, a drive system including a transmission for a hybrid electric vehicle is provided. The system includes a planetary gear set having first, second, third and fourth elements. The second element connects with an output shaft of the transmission. A first output shaft of an internal combustion engine connects with the third element for driving the third element. The system also includes a transmission housing and an electric motor having an output shaft connecting with the first element for driving the first element in response to an electrical signal.

The system further includes non-friction, first and second brake assemblies. The first brake assembly has a coupling state for coupling the fourth element to the housing and an uncoupling state for uncoupling the fourth element from the housing. The second brake assembly has a coupling state for coupling the third element to the housing and an uncoupling state for uncoupling the third element from the housing. The first and second brake assemblies are non-hydraulically controlled to change state to maintain a desired transmission ratio. The system still further includes an electric motor-generator unit having an output shaft connecting with the fourth element for driving the fourth element in response to an electrical signal. A second output shaft of the engine connects with the fourth element through the unit for driving the fourth element. The system has a plurality of different operating modes including a reverse gear or operating mode powered electrically and by the engine.

The first, second, third and fourth elements may comprise a first sun gear, at least one ring gear, at least one carrier, and a second sun gear, respectively.

The planetary gear set may be a Ravigneaux, a Simpson or a modified Ravigneaux gear set.

The transmission may be a power-split, RWD transmission.

Still further in carrying out the above object and other objects of at least one embodiment of the invention, a drive system including a transmission for a hybrid electric vehicle is provided. The system includes a planetary gear set including first, second, third and fourth elements. The second element connects with an output shaft of the transmission. The third element connects with a first output shaft of an internal combustion engine for driving the third element. The system also includes a transmission housing and an electric motor having an output shaft connecting with the first element for driving the first element in response to an electrical signal. The system further includes an electric motor-generator unit having an output shaft connecting with the fourth element for driving the fourth element. A second output shaft of the engine connects with the fourth element through the unit for driving the fourth element in response to an electrical signal. The system has a plurality of different operating modes including a reverse gear or generating mode powered electrically and by the engine. The system still further includes non-friction, first and second clutch assemblies. The first clutch assembly is non-hydraulically controlled to change between a coupling state for coupling the third element to the first output shaft of the engine and an uncoupling state for uncoupling the third element from the first output shaft of the engine. The second clutch assembly is non-hydraulically controlled to change between a coupling state for coupling the fourth element to the second output shaft of the engine through the motor-generator unit and an uncoupling state for uncoupling the fourth element from the second output shaft of the engine.

The transmission may be a power-split, RWD transmission.

The vehicle may be a truck.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a chart which shows various operating modes of the drive system of FIGS. 1 and 2 and the corresponding states of the components of the system to achieve these operating modes;

FIGS. 4a-4f are lever diagrams which correspond to the first six EV (electric vehicle) modes, respectively, of FIG. 3 with respect to the system of FIGS. 1 and 2;

FIGS. 5a-5f are lever diagrams which correspond to the second six EV modes, respectively, of FIG. 3, with respect to the system of FIGS. 1 and 2;

FIGS. 6a-6f are lever diagrams which correspond to the last two EV modes and the first four hybrid modes, respectively, of FIG. 3 with respect to the system of FIGS. 1 and 2;

DESCRIPTION OF EXAMPLE EMBODIMENT

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
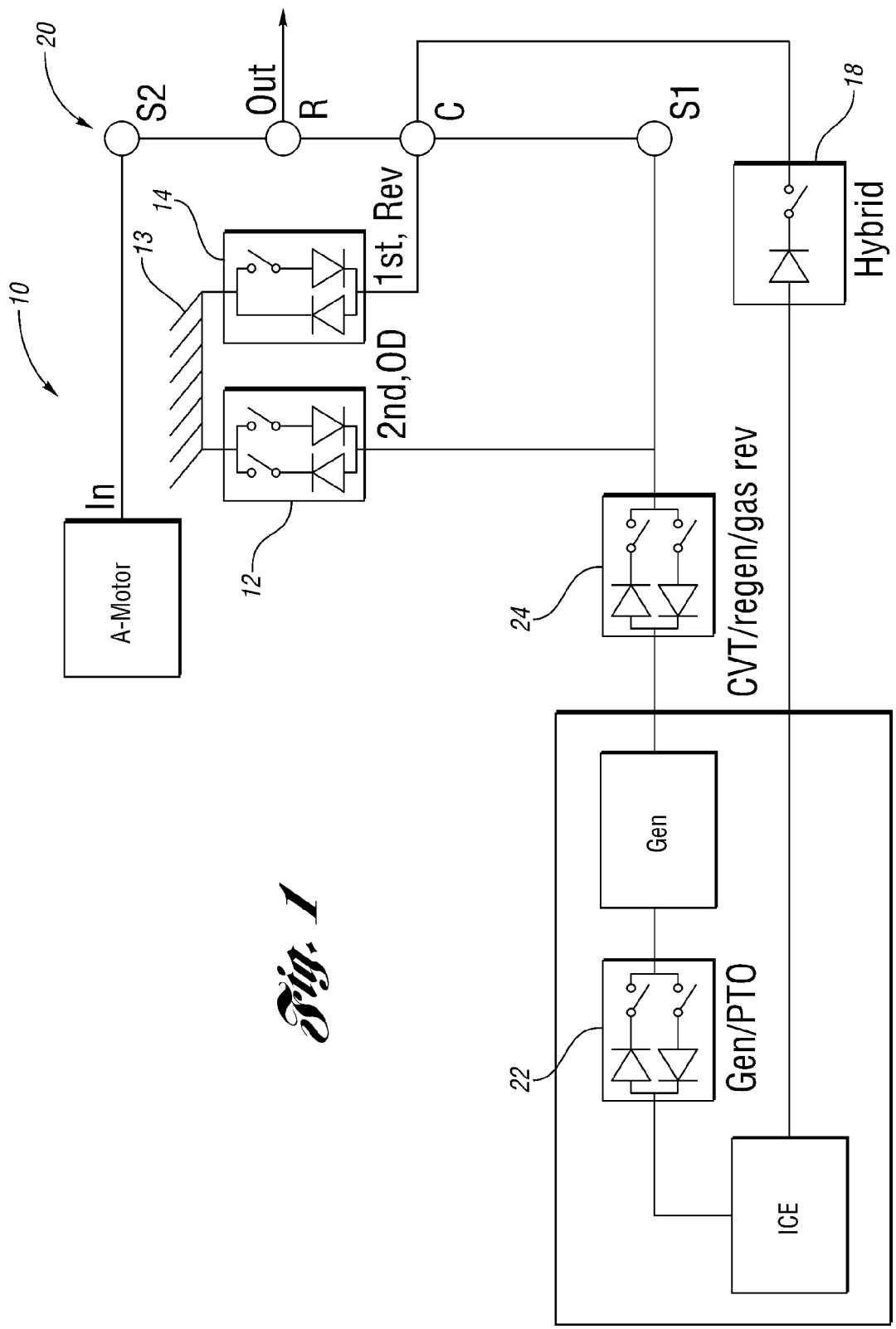
FIG. 1 is a schematic block diagram of a drive system including a transmission for a hybrid electric vehicle and constructed in accordance with at least one embodiment of the present invention and including a lever diagram.

FIG. 1 is a schematic block diagram of a drive system including a transmission, generally indicated at 10, for a hybrid electric vehicle. The transmission 10 may be a power-split, RWD transmission for a truck that has a plurality of different operating modes including EV modes, hybrid modes, gas modes and generator/PTO modes as shown in the chart of FIG. 3. One of the hybrid operating modes includes a reverse gear or operating mode powered electrically and by an internal combustion engine (ICE in FIGS. 1 and 2). In other words, the reverse gear is not powered solely by a battery or other electrical energy storage device of the vehicle.

Figure 2:
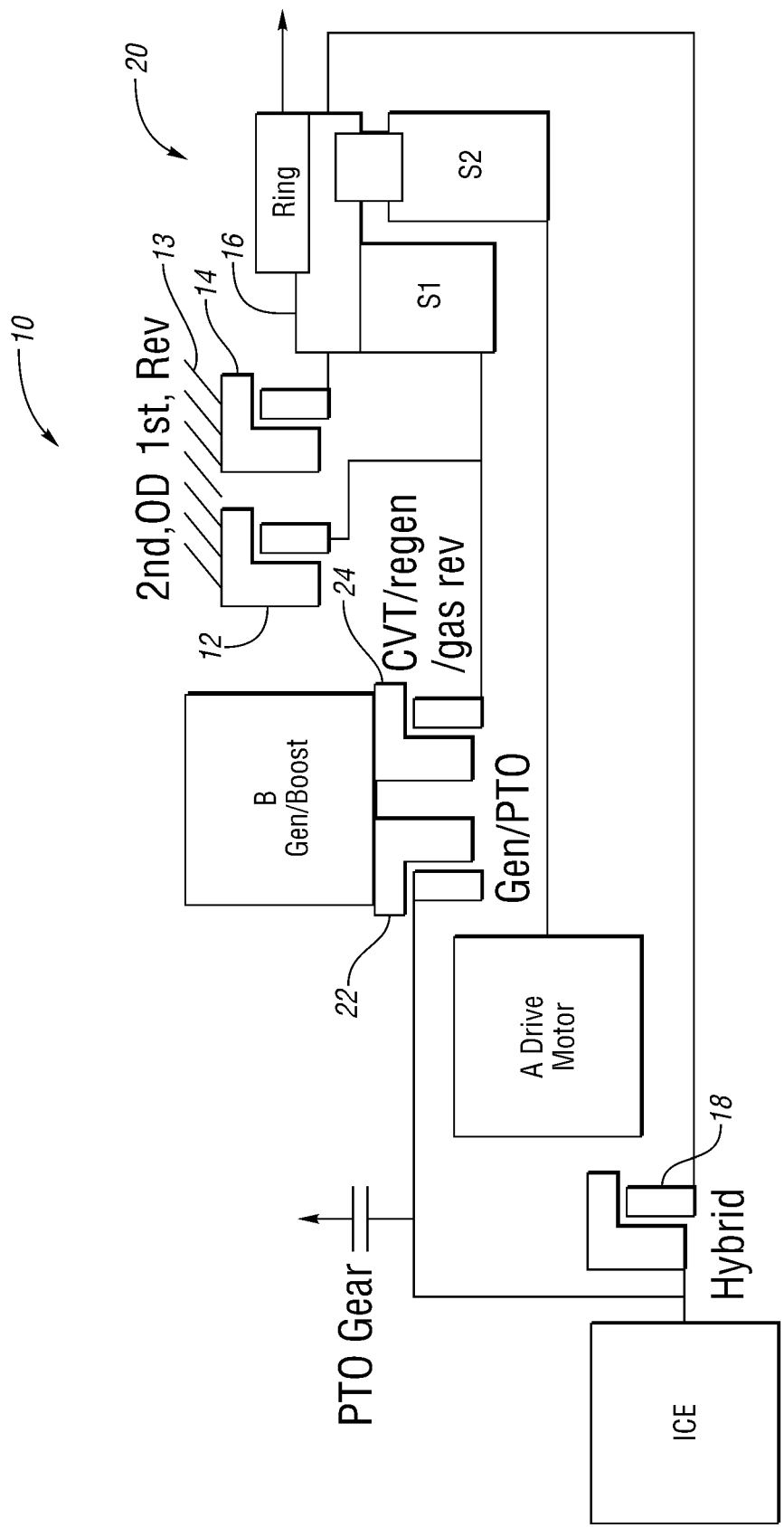
FIG. 2 is a schematic block diagram similar to the diagram of FIG. 1 and showing a gear set and coupling assemblies of the system as blocks.

The transmission 10 includes an A-motor (A drive motor in FIG. 2 or Mot A in FIG. 3) and a power transducer in the form of an electric motor-generator unit (Gen, in FIG. 1) (also referred to as "B gen/boost" in FIG. 2 and Mot B in FIG. 3). The unit is a power transducer that can be used as either an electric motor or a generator, converting between electrical power and mechanical power as is well known in the art of hybrid electric vehicle drive systems. The transmission 10 connects to a first output shaft as well as a second or auxiliary output shaft of the gas or internal combustion engine (ICE).

The transmission 10 includes a static, controllable two-way non-friction brake assembly 12 (which operates in $2^{nd}$ gear and overdrive (OD)) and a passive, controllable, forward non-friction brake assembly 14 (which operates in first and reverse gears). However, it is to be understood that it may be desirable to substitute a controllable two-way non-friction brake assembly for the brake assembly 14 to turn it off in neutral in EV mode to achieve a "true" neutral state (i.e. see Note 1 in FIG. 3). FIG. 1 shows a hard, first gear path meaning that if Motor A were to spin forward and unit B were to spin backward the vehicle would move under power.

The transmission 10 also includes a dynamic, controllable, one-way non-friction clutch assembly 18 (which operates in hybrid modes). The transmission 10 further includes a pair of dynamic, two-way, controllable non-friction clutch assemblies 22 and 24 (which operate in generator/PTO modes, and CVT/REGEN/gas rev modes, respectively). The clutches 12, 14, 18, 22 and 24 are clutches generally available from Means Industries of Saginaw, Mich. and some of which are shown in U.S. patent publication 2012/0149518.

FIG. 1 further includes a lever diagram which corresponds to the transmission 10. The transmission 10 includes the first electric drive motor (A-Motor), the controllable or selectable clutches 12, 14, 18, 22 and 24 and the motor-generator unit as shown in FIG. 1 as "Gen." The clutch 18 connects to a first shaft of the gas or internal combustion engine (ICE). The clutch 22 connects to a second or auxiliary shaft of the ICE. The clutches 12 and 14 are brake clutches since one of the coupling members of each of the clutches 12 and 14 is fixed to the transmission housing 13 (as shown in FIG. 2) so as not to rotate. The clutches 18, 22 and 24 are dynamic clutches wherein both of the coupling members are free to rotate relative to each other. The unit, Gen, (i.e. Mot B in FIG. 3 and B Gen/Boost in FIG. 2) provides another source of drive torque to the power flow when it acts as a motor.

A main controller (not shown) typically includes motor and engine controls or control logic which, in turn, performs a number of control functions including a transmission control algorithm. The main controller directly controls the brake clutches 12 and 14 and the clutch 18 as well as a solenoid controller which may be "onboard" the clutches 22 and 24 together with a solenoid. Each coupling assembly 12, 14 and 18 changes between its locked mode and its overrun mode in response to a control signal directly from the main controller. The solenoid controller controls the coupling assemblies 22 and 24 in response to a control signal from the main controller. Control algorithms for the clutches 12, 14, 18, 22 and 24 are portions of the overall transmission control algorithm.

The transmission 10 preferably includes a double planetary gear set, generally indicated at 20, comprising four members of the Ravigneaux type. The gear set 20 includes a basic gear set whose planet carrier carries a first set of planet pinions meshing with a second set of planet pinions (collectively, C or 16 in FIG. 2) a first sun gear, S1, a second sun gear, S2, and a ring gear, R.

The four torque transmitting members C, S1, S2 and R are associated with the electric A-motor, the motor-generator unit or B-motor, the ICE (through the B-motor), the brake clutches 12 and 14, the clutches 18, 22 and 24 and an output shaft of the transmission 10. The second sun gear, S2, is driven by the A-Motor. The ring gear, R, is fixed for rotation with the output shaft of the transmission 10. The member, C, is associated with the brake clutch 14 as well as the first output of the ICE via the clutch 18. The fourth member, S1, is associated with the brake clutch 12, the B-motor or unit, the clutch 24, the clutch 22 and the second or auxiliary shaft of the ICE through the motor-generator unit.

A few operating modes of the modes shown in the chart of FIG. 3 will now be described. Referring to FIGS. 3 and 4a, (wherein both motor A and motor B operate in EV modes), in first gear, motor A runs forward and motor B runs backward and both motors are additive to the output. Both motors react about C. In the all-electric, first gear, the A-motor drives the member, S2, according to the low reduction ratio of the gear set 20 with the brake clutch 14 engaged thereby holding member C against rotation and with clutch 24 engaged.

Referring to FIGS. 3 and 4f, in all-electric, second gear the A-Motor drives the member, S2, according to the intermediate reduction ratio of the gear set 20 with the brake clutch 12 engaged and the clutch 24 engaged. The A-motor runs alone since the prior requirement is less in second gear (i.e. motor A is sufficient). Motor B (i.e. motor-generator unit) is off and grounded In all-electric, second gear, as the A-motor speeds the vehicle up and starts to spin so fast that it starts to run less efficient, motor B (i.e. Gen) starts up and the transmission is a CVT from second gear to direct drive (1:1) as shown in FIG. 3 and FIGS. 5a and 5b.

In all-electric, reverse gear or drive, the clutch 14 is engaged and clutch 24 is engaged. S2 is driven backwards by the A-Motor thus driving the ring gear output backwards.

All-electric, first hill hold (HH) and reverse hill hold (HH) operating modes are both user selected. In first hill hold of FIGS. 3 and 4d, when activated, the COAST (i.e. right) side of the clutch 12 turns on when vehicle speed is less than 3 mph and turns off when R is greater than 3 mph. It allows forward movement (free-wheels) but ties C, S1 and R to ground when R attempts to roll backwards. This works for A+B, A, or B modes as well.

By contrast, in reverse hill hold (HH) mode, the forward (i.e. left) side of the clutch 12 comes on when the vehicle speed is 0 to −3 mph (turns off when R is less than −3 mph). It allows reverse movement (free-wheels) but it ties C, S1 and R to ground when R attempts to roll forward. This works for A+B, A, B and serial hybrid Rev. also.

Figure 7A:
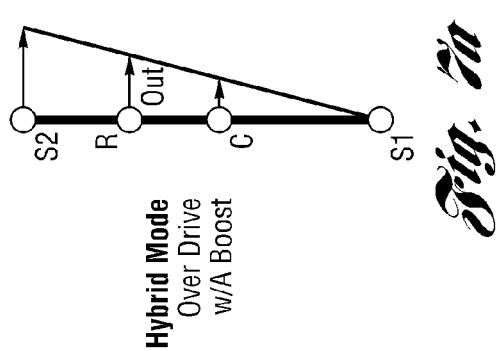
FIGS. 7a-7f are lever diagrams which correspond to the last six hybrid modes, respectively, of FIG. 3 with respect to the system of FIGS. 1 and 2.
Figure 7B:
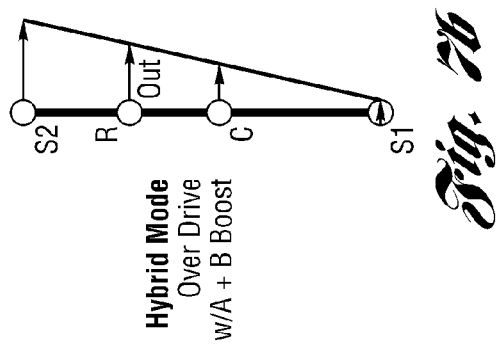
Figure 7C:
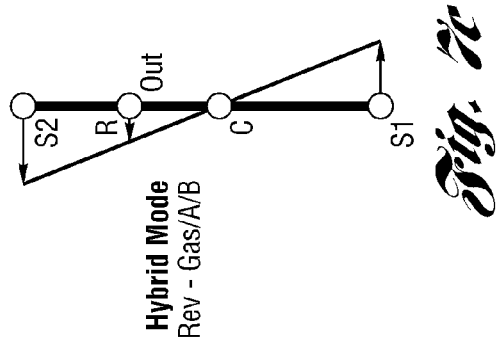
Figure 7D:
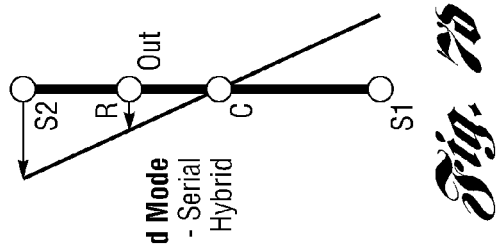
Figure 7E:
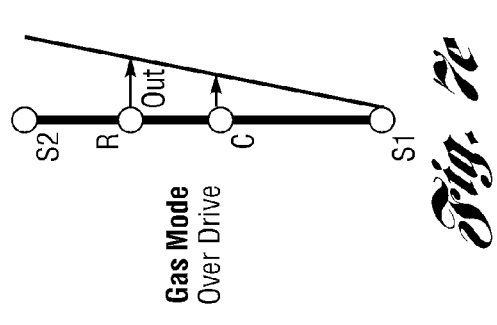

Referring to FIGS. 3 and 7d, a serial hybrid reverse mode is provided in addition to the previously described all-electric reverse mode by energizing the ICE, the A-motor and the B-motor (the motor-generator unit) and by engaging the clutches 14 and 22.

Referring to FIGS. 3 and 7c, a power split, reverse mode is provided by energizing the ICE, the A-motor, unit B (which operates as a generator) and by engaging the clutches 14, 22 and 24. A MAX reverse mode is optional when unit B is operated as an electrical motor.

Figure 7F:
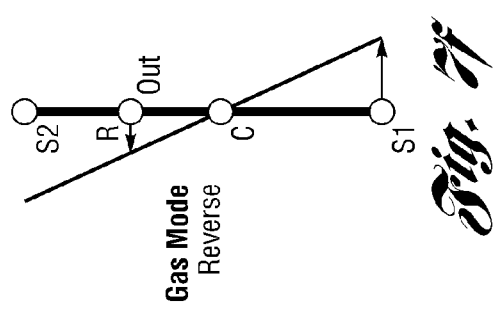

Referring to FIGS. 3 and 7f, a gas-only reverse mode is provided by energizing the ICE and engaging the clutches 14, 22 and 24.

Figure 8A:
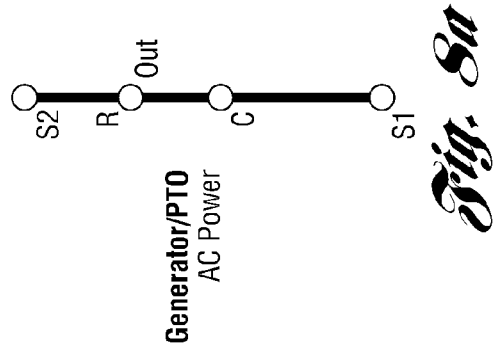
FIGS. 8a and 8b are lever diagrams which correspond to the two generator/PTO modes, respectively, of FIG. 3 with respect to the system of FIGS. 1 and 2.

Referring to FIGS. 3 and 8a, the transmission 10 may operate as an AC power generator by energizing the ICE and the motor-generator unit and engaging the clutches 12, 14 and 22. This mode allows the transmission 10 to provide AC power for power tools or in the event of home power outages. The vehicle is typically in park with the ICE and generator unit disconnected from the output of the transmission 10 (i.e. see Note 2 in FIG. 3).

Figure 8B:
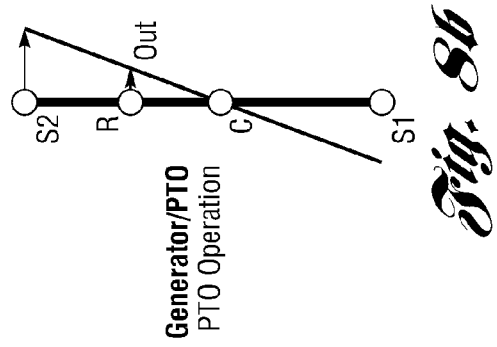

Referring to FIGS. 2, 3 and 8b, the transmission may operate in a PTO mode or operation wherein the PTO (power take off) is in the second or auxiliary shaft of the ICE. In this mode, the ICE, the A-motor and the motor-generator unit are energized and the clutches 14 and 22 are engaged. The PTO mode is a serial hybrid mode which allows the ICE to operate at idle to work the PTO. The generator dumps power directly to the A-motor and battery. The A-motor works in first and reverse ratio. This mode is particularly applicable for a snow plow application.

The transmission 10 is preferably packaged as a rear wheel drive (RWD) as shown in FIG. 2 and is adapted to a PHEV with the addition of the disconnect clutch 18 of the transmission 10. As previously mentioned, the clutch 18 connects to the gas or internal combustion engine (ICE).

Alternatively, the gear set 20 may be a Simpson gear set or other type of gear set such as a modified Ravigneaux gear set which may be represented by a 4 node lever diagram. The modified Ravigneaux gear set typically has one carrier, two distinct ring gears and saw gears. The Simpson gear set may be more efficient with less mesh loss than the above-described gear sets.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive system including a transmission for a hybrid electric vehicle, the system comprising:
   a gear set including first, second, third and fourth elements, the second element connecting with an output shaft of the transmission and a first output shaft of an internal combustion engine connecting with the third element for driving the third element;
   a transmission housing;
   an electric motor having an output shaft connecting with the first element for driving the first element in response to an electrical signal; and
   an electric motor-generator unit having an output shaft connecting with the fourth element for driving the fourth element in response to the electrical signal, a second output shaft of the engine connecting with the fourth element through the electric motor-generator unit for driving the fourth element, wherein the system has a plurality of different operating modes including a reverse gear or operating mode powered electrically and by the engine.

2. The system as claimed in claim 1 further comprising a non-friction brake assembly having a coupling state for coupling the fourth element to the housing and an uncoupling state for uncoupling the fourth element from the housing, the brake assembly being non-hydraulically controlled to change state to maintain a desired transmission ratio.

3. The system as claimed in claim 1 further comprising a non-friction brake assembly having a coupling state for coupling the third element to the housing and an uncoupling state for uncoupling the third element from the housing, the brake assembly being non-hydraulically controlled to change state to maintain a desired transmission ratio.

4. The system as claimed in claim 1 further comprising non-friction, first and second brake assemblies, the first brake assembly having a coupling state for coupling the fourth element to the housing and an uncoupling state for uncoupling the fourth element from the housing, the second brake assembly having a coupling state for coupling the third element to the housing and an uncoupling state for uncoupling the third element from the housing, the first and second brake assemblies being non-hydraulically controlled to change state to maintain a desired transmission ratio.

5. The system as claimed in claim 1 further comprising a non-friction clutch assembly being non-hydraulically controlled to change between a coupling state for coupling the fourth element to the second engine output shaft through the unit and an uncoupling state for uncoupling the fourth element from the second engine output shaft.

6. The system as claimed in claim 1 further comprising a non-friction clutch assembly being non-hydraulically controlled to change between a coupling state for coupling the unit to the second output shaft of the engine and an uncoupling state for uncoupling the unit from the second output shaft of the engine.

7. The system as claimed in claim 1 wherein the fourth, second, third, and first elements comprise a first sun gear, at least one ring gear, at least one carrier and a second sun gear, respectively.

8. The system as claimed in claim 1 further comprising a non-friction clutch assembly being non-hydraulically controlled to change between a coupling state for coupling the third element to the first output shaft of the engine and an uncoupling state for uncoupling the third element from the first output shaft of the engine.

9. The system as claimed in claim 1 wherein the transmission is an automatic transmission.

10. The system as claimed in claim 1 wherein the transmission is a multi-speed, step-ratio transmission having a CVT mode for automotive vehicles.

11. The system as claimed in claim 1 wherein the gear set is a Ravigneaux or a Simpson or a modified Ravigneaux gear set.

12. The system as claimed in claim 1 wherein the second output shaft of the engine is an auxiliary shaft.

13. The system as claimed in claim 1 wherein the transmission is a power-split, RWD transmission.

14. A drive system including a transmission for a hybrid electric vehicle, the system comprising:
a planetary gear set including first, second, third and fourth elements, the second element connecting with an output shaft of the transmission, a first output shaft of an internal combustion engine connecting with the third element for driving the third element;
a transmission housing;
an electric motor having an output shaft connecting with the first element for driving the first element in response to an electrical signal;
non-friction, first and second brake assemblies, the first brake assembly having a coupling state for coupling the fourth element to the housing and an uncoupling state for uncoupling the fourth element from the housing, the second brake assembly having a coupling state for coupling the third element to the housing and an uncoupling state for uncoupling the third element from the housing, the first and second brake assemblies being non-hydraulically controlled to change state to maintain a desired transmission ratio; and
an electric motor-generator unit having an output shaft connecting with the fourth element for driving the fourth element in response to an electrical signal, a second output shaft of the engine connecting with the fourth element through the electric motor-generator unit for driving the fourth element, wherein the system has a plurality of different operating modes including a reverse gear or operating mode powered electrically and by the engine.

15. The system as claimed in claim 14, wherein the fourth, second, third, and first elements comprise a first sun gear, at least one ring gear, at least one carrier, and a second sun gear, respectively.

16. The system as claimed in claim 14 wherein the planetary gear set is a Ravigneaux, a Simpson or a modified Ravigneaux gear set.

17. The system as claimed in claim 14 wherein the transmission is a power-split, RWD transmission.

18. A drive system including a transmission for a hybrid electric vehicle, the system comprising:
a planetary gear set including first, second, third and fourth elements, the second element connecting with an output shaft of the transmission, the third element connecting with a first output shaft of an internal combustion engine for driving the third element;
a transmission housing;
an electric motor having an output shaft connecting with the first element for driving the first element in response to an electrical signal;
an electric motor-generator unit having an output shaft connecting with the fourth element for driving the fourth element, a second output shaft of the engine connecting with the fourth element through the electric motor-generator unit for driving the fourth element in response to an electrical signal, wherein the system has a plurality of different operating modes including a reverse gear or operating mode powered electrically and by the engine; and
non-friction, first and second clutch assemblies, the first clutch assembly being non-hydraulically controlled to change between a coupling state for coupling the third element to the first output shaft of the engine and an uncoupling state for uncoupling the third element from the first output shaft of the engine, the second clutch assembly being non-hydraulically controlled to change between a coupling state for coupling the fourth element to the second output shaft of the engine through the motor-generator and an uncoupling state for uncoupling the fourth element from the second output shaft of the engine.

19. The system as claimed in claim 18 wherein the transmission is a power-split, RWD transmission.

20. The system as claimed in claim 19 wherein the hybrid electric vehicle is a truck.

* * * * *